United States Patent [19]

Wong

[11] Patent Number: 5,686,368
[45] Date of Patent: Nov. 11, 1997

[54] FIBROUS METAL OXIDE TEXTILES FOR SPECTRAL EMITTERS

[75] Inventor: Eva M. Wong, San Diego, Calif.

[73] Assignee: Quantum Group, Inc., San Diego, Calif.

[21] Appl. No.: 571,605

[22] Filed: Dec. 13, 1995

[51] Int. Cl.$^6$ .................................................. C04B 35/50
[52] U.S. Cl. ........................... 501/152; 501/906; 252/492
[58] Field of Search ...................................... 501/152, 906; 252/492

[56] References Cited

U.S. PATENT DOCUMENTS

| | | | |
|---|---|---|---|
| 359,524 | 3/1887 | Welsback | 252/492 |
| 396,693 | 1/1889 | Hastings | 252/497 |
| 409,529 | 8/1889 | Welsbach | 252/492 |
| 563,524 | 7/1896 | Welsbach | 252/492 |
| 568,184 | 9/1896 | Voelker | 252/492 |
| 574,862 | 1/1897 | Van Deth | 252/492 |
| 575,261 | 1/1897 | Moschelse | 252/492 |
| 575,262 | 1/1897 | Mosheles | 252/492 |
| 575,263 | 1/1897 | Moscheles | 252/492 |
| 581,364 | 4/1897 | Nienstaedt | 252/492 |
| 588,685 | 8/1897 | Mahler | 252/492 |
| 593,106 | 11/1897 | Knofler | 252/492 |
| 609,702 | 8/1898 | Puchmuller | 252/492 |
| 614,556 | 11/1898 | Killing | 252/492 |
| 614,583 | 11/1898 | Simonini | 431/100 |
| 640,326 | 1/1900 | Saulmann | 252/492 |
| 657,235 | 9/1900 | Daubenspeck | 252/492 |
| 662,170 | 11/1900 | Koch | 252/492 |
| 684,192 | 10/1901 | Clamond | 252/492 |
| 855,798 | 6/1907 | Mayer | 427/159 |
| 966,283 | 8/1910 | White | 431/100 |
| 973,253 | 10/1910 | Bohm | 252/492 |
| 3,082,051 | 3/1963 | Wainer et al. | 204/56 |
| 3,082,099 | 3/1963 | Beasley | 106/286.1 |
| 3,096,144 | 7/1963 | Wainer et al. | 264/65 |
| 3,385,915 | 5/1968 | Hamling | 264/0.5 |
| 3,663,182 | 5/1972 | Hamling | 428/224 |
| 3,875,296 | 4/1975 | Brubaker | 423/592 |
| 4,162,301 | 7/1979 | Hamling | 423/440 |
| 4,277,269 | 7/1981 | Sweeting | 65/459 |
| 4,584,426 | 4/1986 | Nelson | 136/253 |
| 4,604,228 | 8/1986 | Perroud et al. | 252/492 |
| 4,776,895 | 10/1988 | Goldstein | 136/253 |
| 4,826,426 | 5/1989 | Nelson | 431/100 |
| 4,877,553 | 10/1989 | Diedrich | 252/492 |
| 4,883,619 | 11/1989 | Diederich et al. | 264/60 |
| 4,906,178 | 3/1990 | Goldstein et al. | 431/79 |
| 5,044,939 | 9/1991 | Dehlsen | 432/25 |
| 5,124,286 | 6/1992 | Edgar | 501/103 |
| 5,137,583 | 8/1992 | Parent et al. | 136/253 |
| 5,281,131 | 1/1994 | Goldstein | 431/253 |
| 5,356,487 | 10/1994 | Goldstein et al. | 136/253 |
| 5,360,490 | 11/1994 | Nelson | 136/253 |
| 5,380,580 | 1/1995 | Rogers et al. | 428/219 |
| 5,400,765 | 3/1995 | Goldstein et al. | 126/39 |

OTHER PUBLICATIONS

Program Book for 2nd NREL Thermophotovoltaic Generation of Electricity Conference, Jul. 17–19, 1995, Colorado Springs, CO; pp. 5 and 7.

Glenn A Holmquist and Eva M. Wong; Abstract Entitled: "Laboratory Development TPV Generator"; Program Book for 2nd NREL Thermophotovolaic Generation of Electricity Conference, Jul. 17–19, 1995, Colorado Springs, CO; p. 21.

(List continued on next page.)

Primary Examiner—Mark L. Bell
Assistant Examiner—Louis M. Troilo
Attorney, Agent, or Firm—Christie, Parker & Hale, LLP

[57] ABSTRACT

Several new and useful compositions of rare earth oxides and mixtures of rare earth oxides are made into strong flexible fibrous textiles and strands. By varying the mixtures of rare earth metal oxides that make up the textiles and strands, the emission spectra can be matched to the absorption spectra of a variety of semiconductor photovoltaic cells. Furthermore, the addition of between 1–10 mol % of thorium oxide to the rare earth metal oxide fibers inhibits microcrystalline grain growth at high temperatures.

11 Claims, 3 Drawing Sheets

OTHER PUBLICATIONS

Eva M. Wong, Parvez N. Uppal, Jeff Hickey, and Glenn Homquist; Abstract Entitled: "Improved Efficiencies with Multiband Spectral Emitters Matched to MBE Grown Photovoltaic Cells"; Program Book for 2nd NREL Thermophotovolaic Generation of Electricity Conference, Jul. 17–19, 1995, Colorado Springs CO; p. 39.

E.Maeda, S. Uenosono, T. Yamamura, T. Kanemaru, M. Kumagai, T. Funahashi; "Morphology of Grain Boundry Phases in Aluminum Nitride Ceramics with Y2O3 Additive"; *Ann. Chim. Fr.* 1991, 16, pp. 497–506.

Leroy Erying; "The Binary Rare Earth Oxides"; *Handbook on the Physics and Chemistry of Rare Earths;* edited by K. A. Gschneider, Jr. and L. Eyring, North Holland Publishing Co., 1979; pp. 337–425. no month.

Mark Goldstein and Alex Kushch; "Low NOx Thermophotovoltaic Generator"; *Proc. 45th Ann. Int. Appliance Technical Conf.;* May 9–11, 1994; Madison WI; pp. 269–280.

Leroy Eyring; "Refactory Oxides of the Lanthanide and Actinide Elements"; *High Temperature Oxides, Part II; Oxides of Rare Earths, Titanium, Zirconium, Hafnium, Niobium and Tantalum;* Edited by Allen M. Alper; Academic Press, 1970; pp. 11–97 no month.

Robert E. Nelson; "Thermophotovoltaic Emitter Development"; AIP Conference Proceedings 321, The First NREL Conference on Thermophotovolaic Generation of Electricity; Edited by Timothy J. Coutts and John P. Benner; American Institute of Physics, New York 1995; pp. 80–96. no month.

Liang A. Xue, Karsten Meyer, I–Wei Chen; "Control of Grain–Boundry Pinning in AL2O3/ZrO2 Composites with Ce3+/Ce4+ Doping"; *J. Am. Ceram. Soc.* 75 (1992) pp. 822–829. no month.

Peter L. Adair, M. Frank Rose; "Composite Emitters for TPV Systems" AIP Conference Proceedings 321, The First NREL Conference on Thermophotovoltaic Generation of Electricity; Edited by Timothy J. Coutts and John P. Benner; American Institute of Physics, New York 1995; pp. 80–96. no month.

Ernst M. Levin; "Phase Diagrams for Ceramists"; American Ceramics Society, Westerville, OH 1991; pp. 126–127 and 142–143. no month.

FIBROUS METAL OXIDE TEXTILES FOR SPECTRAL EMITTERS

This invention was made with Government support under MDA972-93-C-0042 awarded by the Department of Defense. The Government has certain rights in the invention.

BACKGROUND

1. Field of Invention

The present invention pertains to the manufacture and composition of metal oxide fibers, felts and fabrics, especially those containing rare earth oxides, that are strong, flexible and useful as narrow band spectral emitters.

2. Background Information

In the past few years there has been a great interest in the generation of electricity by thermophotovoltaic (TPV) devices. Such devices combust natural gas, or other fossil fuels to thermally stimulate the emission of photons (i.e., light) from an emitter structure. The light generated by the emitter structure is, in turn, absorbed by photocells which generate electricity. Several U.S. Patents describe TPV devices, see, for example, U.S. Pat. Nos. 4,584,426; 4,597,734; 4,776,895; 4,906,178; 5,137,583; 5,281,131; 5,356,487.5,360,490; 5,383,976; 5,403,405; and 5,439,532.

Presently there are several limitations to high efficiency in TPV devices: (1) accommodating high temperature operation of the emitter without melting; (2) increasing the photon content of peak spectral emissions from the emitter; (3) overcoming the photovoltaic current collection or power density limitations; and (4) cost of the units versus conventional electricity generating means.

The use of "superemissive" ceramic materials for the emitter structures have been proposed as a solution to several of the above mentioned limitations. "Superemissive" materials, when heated above a threshold temperature emit photons in relatively narrow and discrete spectral bands. In contrast, blackbody or greybody emitters, when heated, exhibit much broader spectral emission bands.

An example of the use of "superemitters" in a TPV device is contained in U.S. Pat. No. 5,356,487 in which Goldstein et al. disclose the use of superemissive burners to improve the efficiency of electrical generation in TPV devices. The disclosed burners are made using a vacuum forming method in which a burner skeleton (typically a metal screen) is dipped into a fiber suspension and a vacuum is used to "pull" the suspension through the burner skeleton. The fiber suspension is made of short (½ to 2 cm long) refractory fibers; a porosity agent, such as methylmethacrylate beads; and a alumina "sol" which is used as a binding agent. The "green" burner structure is then heated to high temperature to form a completed metal oxide fiber burner. Composite "superemitting" burners are made by layering a variety of metal oxide fibers, such as ytterbia (ytterbium oxide), yttria alumina garnet (YAG) (a mixture of yttrium oxide and aluminum oxide), holmia (holmium oxide), ceria/thoria (a mixture of cerium oxide and thorium oxide), to give a structure with discrete fiber layers. Although very useful, these burners tend to be fragile and rigid once formed. Essentially, the same method is disclosed by Goldstein in U.S. Pat. Nos. 4,776,895; 4,906,178; and 5,400,765.

Heating metal oxide containing mixtures to generate light is a technology known before 1900 and such applications are disclosed in numerous U.S. Patents, for example U.S. Pat. Nos. 359,524; 409,529; 563,524; 575,261; 614,556; 640,326. The principal focus of much of this early work involves compositions containing thorium oxide as the principal constituent with a various amounts of other oxides being formed into mantles for use in gas lighting. These additional oxides included cerium oxide, yttrium oxide, strontium oxide, lanthanum oxide, uranium oxide, etc. In fact much this technology is still in use today in the mantles of gas powered lanterns. As is well known, however, such mantles are very fragile and cannot be touched or handled without damage.

Presently in the literature there are a number of ways of making metal oxides into fibers, fabrics and felts. The "relic" process is the easiest and the most economically viable way of making metal oxide fibers, fabrics and felts. Generally described, the "relic" process involves soaking a template, usually a structure made of carbon containing compounds, in a solution containing a metal salt. The soaked template is then heated to elevated temperatures to oxidize or "burn-out" the carbon containing compounds leaving behind a metal oxide structure. The conditions of this latter step are important in formation of strong and yet flexible fibers, fabrics and felts. In addition other factors, such as the metal salts used and their concentration, and the selection of the materials that make up the template, can greatly influence the physical properties, especially flexibility, of the resulting product.

The use of the "relic" process to make zirconia (zirconium oxide) fibers and textiles is disclosed by Hamling in U.S. Pat. Nos. 3,385,915; 3,663,182; and, 3,860,529. In each patent, Hamling discloses a "relic" process for making metal oxide fibers, fabric and felts. The process disclosed is: (1) impregnate an organic template with a metal salt; (2) dry; (3) heat the metal salt impregnated template to a temperature between 400° C.–800° C. at a rate of 10° C./hr–100° C./hr in an atmosphere containing 5–25% volume oxygen; and, (4) maintain the temperature between 400° C.–800° C. till the template has been "burnt-out". Several detailed examples are given in all three patents in which fabrics or fibers are made from a variety of alkaline earth and early transition metal oxides. However, Hamling does not teach the conditions under which essentially pure or mixtures of rare earth oxides can be successfully made into strong, flexible fibers, fabrics, or felts.

Goldstein et al. in the series of U.S. Pat. Nos. 4,776,895; 5,356,487; and, 5,400,765 discloses, but does not claim, a "relic" method of making superemitting fibers. The disclosed method uses cut rayon fibers which are soaked in a metal nitrate solution having a concentration of 1 mg/ml and the nitrate salt comprising: 80–99.88% (wt/wt) $Yb(NO_3)_3 \cdot 6 H_2O$; 0–3% $Er(NO_3)_3$; 0–5% $Al(NO_3)_3$; and 0–8% $Y(NO_3)_3$. The soaked fibers are dried, and treated with ammonia gas at 25° C. (±5°) and 20–80% relative humidity. The ammonia exposed fibers are dried again, heated to 60° C. and finally fired at an unspecified temperature ("several hundred degrees") for an unspecified time period ("to slowly oxidize the carbon containing material to gaseous products"). As mentioned above, these fibers tend to be fragile and inflexible when fabricated into a useful form.

The manufacture of strong, flexible metal oxide fibers, fabrics and felts depends on the microcrystalline structure, especially the size of the metal oxide particles that constitute the fiber. A grain size that is equal to or less than one tenth of the diameter of the fiber is preferred. In order to obtain strong, pore free, dense single phase $Y_2O_3$ ceramics, Alper has found that the addition of a small amount (5–10 mol %) of thorium oxide inhibits the grain boundary movement. In this case thorium oxide is acting as a "pinning agent" at the grain boundary and as such the thorium oxide prevents the growth of large microcrystals. The exact mechanism of how thorium oxide produces this effect is not fully known. However, it is believed that the segregation of thorium oxide at the grain boundaries decreases the boundary migration rate by creating a "drag effect". Other metal oxides, such as hafnium oxide, and zirconium oxide have been found to have a similar effect on the growth of yttrium oxide microcrystalline grains. There is no indication in the literature if thorium oxide, or any of the other oxides, would have a similar effect on the microcrystalline grain size of rare earth metal oxide fibers.

BRIEF DESCRIPTION OF THE INVENTION

There is therefore provided in the practice of this invention, according to a presently preferred embodiment, an improved method for making strong yet flexible fibers, fabrics and felts of rare earth oxides or mixtures of rare earth oxides. The method comprises soaking a fibrous organic polymer template in an aqueous metal nitrate salt solution; drying to remove excess water and metal nitrate; exposing the metal nitrate imbibed template to ammonia gas to give a metal hydroxide imbibed template; washing with water to remove unreacted nitrate salts; heating the metal hydroxide impregnated template under carefully controlled conditions to remove water and the organic matter that makes up the template; and finally sintering the fiber structure to form a flexible yet strong fibrous metal oxide structure.

The disclosed method permits the preparation of several new and useful compositions of rare earth oxides and mixtures of rare earth oxides into a strong yet flexible fiber. Mixtures of rare earth metal oxides have been tailored so that their thermal emission spectra can be matched to the absorption spectra of a variety of semiconductor photovoltaic cells. Finally, the addition of between 1–10 mol % of thorium oxide to the rare earth metal oxide fibers has been found to inhibit the microcrystalline grain growth at high temperatures.

DETAILED DESCRIPTION

The following terms and words are used herein and are defined to mean the following:

"bend radius" is a measure of the flexibility of the fiber, fabric or felt as defined below;

"burn-out" is the process in which controlled oxidation is used to remove the polymeric organic matter that makes up the template;

"emission spectrum" is the thermal emission spectrum of a metal oxide strand or textile measured between the wavelengths of 400 nm and 2500 nm when heated to a temperature between 1000°–1800° C.;

"loading factor" is a measure of the amount of metal salt solution that is absorbed by a strand or textile template during the soaking process;

"relative intensity" is a measure of emission spectral peak height where the intensity of the highest peak is given a value of 1 and any remaining peak intensities are measured as a fraction of the highest peak;

"strand" means a single fiber or string of interlocked fibers that can be used to make up a woven fabric (cloth) or non-woven fibrous material (felt);

"template" means the organic polymer strand or textile that is soaked in the metal salt solution; and "textile" is used generically to mean a woven fabric (cloth) or non-woven fibrous material (felt) that is made up of strands.

This application describes an improved "relic" method for the fabrication of strong, yet flexible metal oxide strands and textiles. These strands and textiles are made of rare earth metal oxide or mixtures of rare earth metal oxides. The product of this method is useful in making emitter structures for TPV devices, gas lantern mantles, or other applications in which heat is used to generate light.

It has been found that several key factors determine the physical properties (flexibility, strength, durability) and the spectral properties of the strands and textiles. These key factors include: selection of the organic polymer that is used to make up the template; selection the metal salts used to impregnate the template; the loading factor of metal salts in the template; the duration and conditions of the burn-out process; and the duration and conditions of the sintering process.

Figure 1:
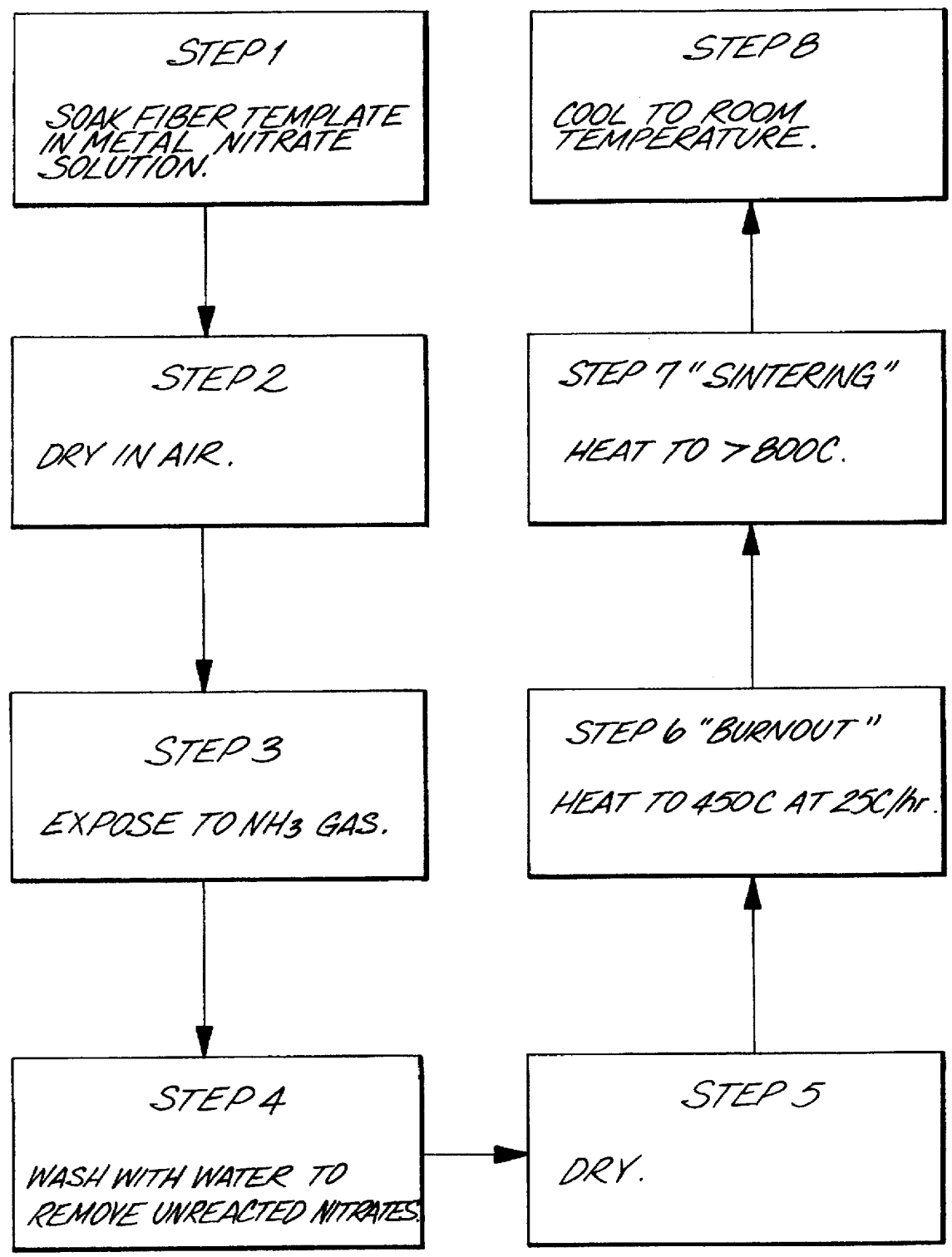
FIG. 1 is a flow chart showing the disclosed method of making metal oxide strands and textiles.

The improved method for the manufacture of strong, yet flexible, metal oxide fibers is shown schematically in FIG. 1. The first step of the improved method involves the soaking of the template in an aqueous metal nitrate soaking solution (FIG. 1, Step 1) The selection of the organic polymer that makes up the template is important to the physical properties, especially tensile strength and bend radius, of the final products. The ideal template material should: readily absorb and retain metal salt solutions; burn-out cleanly in normal air; and, not melt or rapidly decompose when the temperature is slowly increased. Rayon has been found to possess these properties and therefore is preferred. However, other carbohydrate based fibers (i.e., polyester, polyurethane, cellulose, cellophane, viscose, natural wool, silk and natural cotton) can be used in the practice of the disclosed method. One of the many advantages of the present invention is that the template need not be presoaked or pre-treated as disclosed and recommended by Hamling.

The metal nitrate containing soaking solution is typically made of: one liter of deionized water; a metal nitrate salt or a mixture of metal nitrate salts in the molar ratio desired in the final metal oxide product; and, a small amount (approximately 0.1% by volume) of a surfactant, such as Triton X-100 (alkylphenoxypolyethoxyethanol) available from Rohm & Haas Inc. of Philadelphia, Pa. The addition of the surfactant has been found to aid in the uptake of the soaking solution by the template. The metal cation of the nitrate salt may be selected from the following group: $Ce^{+3}$, $Pr^{+3}$, $Nd^{+3}$, $Sm^{+3}$, $Eu^{+3}$, $Gd^{+3}$, $Tb^{+3}$, $Dy^{+3}$, $Ho^{+3}$, $Er^{+3}$, $Tm^{+3}$, $Yb^{+3}$, and $Th^{+4}$ all of which are commonly available from chemical supply companies. The total concentration of the nitrate salts in the soaking solution ranges from about 1.0M to about 2.0M and preferably around 1.6M.

The time interval of the soaking process ranges from 12–48 hours. However it has been found that a soaking period greater than 24 hours does not greatly improve the quality of the final product.

Of greater importance than the soaking time is the loading factor of the template. The loading factor of the template is the ratio of the weight of the template after soaking and drying to the weight of the template before soaking. For example, a loading factor of 1.5 indicates that ⅓ of the soaked template weight is due to nitrate salts. Templates having a loading factor between 1.75 and 2.75 are found to have suitable flexibility and strength while templates having a loading factor between about 2.0 and 2.5 are preferred.

After soaking, excess soaking solution is removed from the template by centrifuging or pressing or wringing (FIG. 1, Step 2). The damp template is then dried under ambient conditions for 2–3 days. After drying at room temperature, the metal nitrate impregnated template is dried in an oven at about 35° C. (±5° C.) for 20–28 hours. It is at this point that the loading factor can be determined and adjusted if desired.

Adjustment of the loading factor to a higher value is done by repeating the soaking process in a solution with higher salt concentrations. Reducing a high loading factor is done by resoaking the template in a soaking solution with a lower salt concentration. The loading factor may also be adjusted by resoaking in a metal nitrate soaking solution with the same concentration and changing the amount of solution removed from the damp cloth. To get a higher loading factor less solution is removed from the cloth and to get a lower loading factor more solution is removed from the cloth.

It has been found that the removal of the excess solution by pressing and drying is needed to prevent the formation of metal nitrate salt crystallites between the fibers of multi-fiber strands or textile templates. Failure to do this gives a final product that is not as flexible and has a much larger bend radius which is defined below.

The dry, metal nitrate impregnated template is similar in appearance to the unsoaked template and retains much of the unsoaked template's flexibility and durability to handling. However, the material is hygroscopic and if allowed to stand for more than a few hours, the oven drying step should be repeated.

In Step 3 (FIG. 1) the nitrate impregnated template is exposed to gaseous ammonia in a chamber that is saturated with the gas. The ammonia gas in the chamber is at ambient temperature and pressure. The nitrate impregnated template is preferably exposed to ammonia for 24 hours. However, exposure times between 12 hours and 48 hours have also been found to work. The role of the ammonia is to mildly "denitrate" the template using the following reaction (unbalanced):

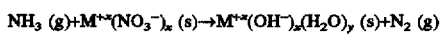

It has been found that this step is preferable to removing the nitrate salt by heating for two reasons. First, it is well known that intimate mixtures of metal nitrate salts and organic matter have a potential to be explosive when heated. Secondly, maintaining control over the burn-out process is much more difficult when nitrate salts are present in the template. Careful control of the burn-out process is important to the control of the physical properties of the final product, as will be discussed latter. Therefore, Step 3 should follow within a few hours after the metal nitrate imbibed template is removed from the 35° C. oven (Step 2). Failure to do this results in a stiff and brittle final product which is undesirable.

Once the strand or textile template has been denitrated, the metal hydroxide impregnated template is washed with sufficient deionized water to remove any unreacted nitrate salts. (FIG. 1, Step 4) Failing to rinse the template at this stage gives a final product that is broken up or crumbles very easily upon handling.

Following the wash, the metal hydroxide impregnated template is dried under ambient conditions for 2–3 days.

(FIG. 1, Step 5) Light heating, up to about 35° C. in an oven can be used to speed the drying process. The strand or textile template at this point is virtually unchanged in appearance and retains much of the flexibility and strength of the original starting template. It is at this point that the template is ready for the burn-out process.

As defined above, the "burn-out" process (FIG. 1, Step 6) is a controlled oxidation of the organic matter that makes up the strand or textile template. The chemical reaction for the removal of the template structure is represented by the following chemical reaction: (unbalanced)

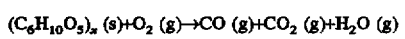

By oxidizing the carbon containing organic polymer $((C_6H_{10}O_5)_x;$ rayon) to gases ($CO$, $CO_2$ and $H_2O$) the burn-out process removes the scaffolding i.e. template, on which the metal oxide strand or textile has been built without destroying the structure.

In addition to oxidation of the template material, the burn-out process causes the metal hydroxide compounds to convert into the metal oxides. This chemical conversion can be represented by the following equation:(unbalanced)

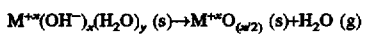

The burn-out process therefore accomplishes two things simultaneously: (1) the removal of the template structure; and (2) the conversion of the metal hydroxide to the metal oxide.

The conditions under which the burn-out process occurs are important to the physical properties of the final metal oxide strand or textile. If the heating rate is too fast, the material will decompose rapidly and the resulting metal oxide structure will be discontinuous. Typically, textile materials subjected to a rapid heating rate will appear to be severely curled and have numerous tears such that the material is not useful. Strands may also curl and break. In either case, the material will not have the desired flexibility.

A typical burn-out process is carried out in air without the addition of other gases. From ambient temperature the oven temperature is increased at a rate between 0.25° C./min and 0.50° C./min until the temperature is about 400° C. Once approximately 400° C. is reached, the temperature is increased to about 450° C. over the course of one hour and the temperature is held at 450° C. for approximately 12 hrs. When the 12 hr/450° C. heating period is over the oven is turned off and is allowed to cool to ambient temperature overnight (approximately 4–12 hrs).

The product of the burn-out process has a yellowish-tan to light brown appearance, but has shrunken in size. For example, if one starts with a piece of rayon cloth that is 100 cm×100 cm as the template, the size of the burnt-out cloth will be approximately 60 cm×60 cm. Typically the template shrinks by approximately 35–45 % as a result of the burn-out process. However, the burnt-out material remains flexible and strong, and can be handled without harm.

The last and final step of the disclosed method is sintering of the burnt-out strand or textile product. (FIG. 1, Step 7) By heating to a high temperature, (i.e., sintering) any residual carbonaceous matter is removed and the microcrystals of metal oxide that make up the individual fibers are fused together. The sintering process is carried out in a tube furnace or other suitable high temperature furnace. Starting at ambient temperature the furnace is heated at a rate between 15° C./min and 25° C./min until about 600° C. (±5° C.) is reached. The temperature is held at approximately 600° C. for 30 minutes and is then raised to the final sintering temperature at a rate between 15° C./min and 25° C./min. The strand or textile is kept at the final sintering temperature for 1–24 hours after which the furnace is turned off and allowed to cool slowly to ambient temperature (approximately 8–12 hours).

The properties of the final product primarily depend on the final sintering temperature. Although important, the amount of time the final sintering temperature is maintained is a secondary consideration depending upon the final sintering temperature itself. If the final sintering temperature is below 600° C., the resulting metal oxide strand of textile will contain residual carbonaceous material which is undesirable. At the other extreme, final sintering temperatures above 1400° C. will give a stiff and rigid product in less than 2 hours. Therefore, if a clean, strong and flexible metal oxide strand or textile is desired, the range of final sintering temperature should be between 600° C. and 1400° C. The following table (Table 1) is useful in determining how long the final sintering temperature should be maintained to obtain the desired product.

TABLE 1

Table of Final Sintering Temperatures and Durations

| Range of Final Sintering Temperature (°C.) | General Duration (hours) | Preferred Duration (hours) |
|---|---|---|
| 600–1400 (General) | 24–1 | 1¼–1¾ |
| 1000–1200 (Preferred) | 2–6 | 2–4 |
| 1000–1100 (Most Preferred) | 2–12 | 2–4 |

The sintering process (FIG. 1, Step 7) is typically carried out as a separate step and in a different oven than the burn-out process (FIG. 1, Step 6). However, this is not required and the sintering step can follow immediately after the burn-out process is complete in the same oven, in which case the cooling to ambient temperature is not needed. Whether the sintering step is carried out as a separate step, or carried out immediately following the burn-out process, the physical and spectral properties of the resulting metal oxide strand or textile are unchanged.

The final metal oxide strand or textile in many respects resembles that of the original starting template. The size however has shrunken from between 45–50% and in all cases the metal oxide product has a flat rather than glossy sheen. The color of the metal oxide strand or textile depends on the mixture of rare earth metal present. Table 2 shows the wide variety of colors generated the presence of differing amounts of rare earth metal oxides.

TABLE 2

Colors and Pantone ™ # of Selected Metal Oxide Textiles

| Formulation | Color (Pantone ™ #) |
|---|---|
| 100% $Yb_2O_3$ | white |
| 100% $Ho_2O_3$ | peach (155U) |
| 50% $Ho_2O_3$:50% $Er_2O_3$ | light pink (169U) |
| 100% $Er_2O_3$ | pink (182U) |
| 100% $Nd_2O_3$ | faint blue (263U) |
| 100% $Eu_2O_3$ | faint green (365C) |

The physical properties of the metal oxide strands and textiles, especially the tensile strength, the flexibility and emission spectra are important in the application to TPV. In the following section, each property is discussed in detail.

The tensile strength of the metal oxide strand or textile is measured as the resistance to breaking or stretching under tension. A simple mechanical testing method and apparatus has been developed to enable the measurement the tensile properties of the metal oxide strands and textiles and is illustrated in FIG. 2.

Figure 2:
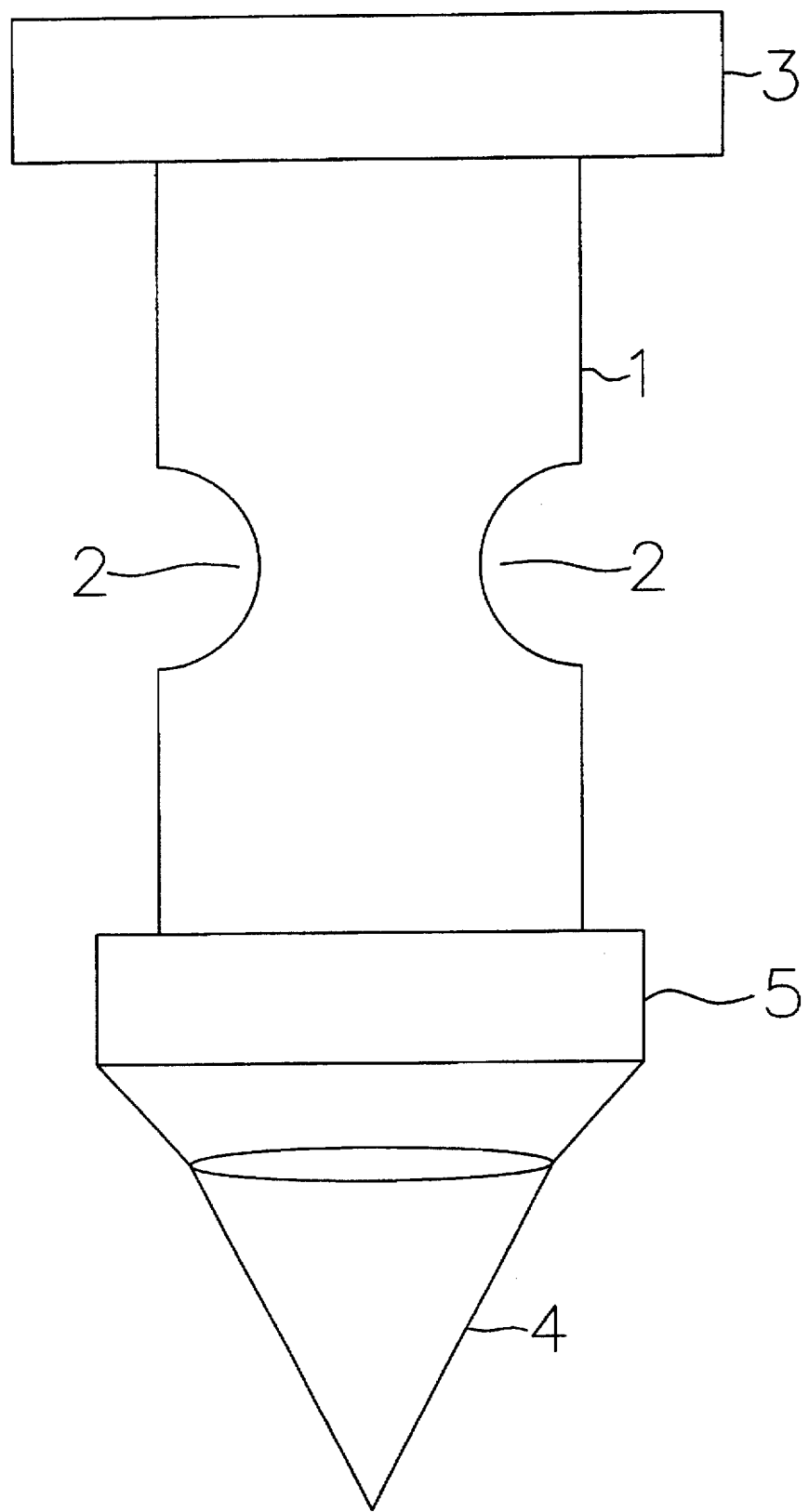
FIG. 2 is an illustration of testing the tensile strength of a textile.

As shown in FIG. 2, a test strip of material 1 having a uniform width is cut into the typical "dogbone" configuration with the length at least twice the full width. Semicircular notches 2 are made in the middle of the test strip to ensure that the samples fail at a point of known cross-section and stress concentrations. The test strip 1 is suspended vertically with one end held in a clamp 3. The clamp is fixed to a sturdy structure (e.g. table or permanently fixed horizonal beam/bar), not shown. The other end of the test strip 1 is attached to a small plastic container for holding water 4 by a second clamp 5. Water is incrementally added to the plastic container 4 in small amounts until the test strip breaks (a failure). Failure of the test strip typically occurs suddenly and catastrophically with no prior indication (such as necking or other ductile motion) of the impending failure. The point along the strip where the failure occurred and the combined weight of the water and container are determined.

Calculation of the stress at the semicircular notch (point of failure) is done using the following method and equation. The elastic stress concentration factor (k) is the ratio of the maximum stress in the stress riser to the nominal stress at the cross-sectional area. For a rectangular test strip with two semicircular notches of a known radius (r) under axial tension, the stress concentration factor (k) is given as:

$$k = 3.065 - 3.37(2r/w) + 0.647(2r/w)^2 + 0.658(2r/w)^3$$

where w is the width of the test strip at the point of failure. The nominal stress (S) is equal to the applied force (F) divided by the cross-sectional area (A) taken at the narrowest point between the notches (A=t•d where t is the thickness of the specimen and d=w−2r). This can be expressed by the following equation:

$$S = F/A$$

where F is the mass of the weight applied times the acceleration constant due to gravity (g, 9.8 m/s$^2$) and A is as noted above. The maximum stress at the notches is then equal to the nominal stress (s) multiplied by the stress concentration factor (k).

Metal oxide textiles made by practicing the presently disclosed method have a tensile strength greater than 75 kPa. In comparison, the rayon textile template has a tensile strength much greater than 250 kPa and could not be accurately measured. Commercially available zirconia felt ZYF-50 available from Zircar Fibrous Products of Florida, N.Y. has a tested tensile strength of about 200 kPa. The following two examples demonstrates the effect of loading factor (Example 1) and heat treatment (Example 2) on the tensile strength of a ytterbium oxide felt.

EXAMPLE 1

Two 15 cm square samples of rayon felt, available as stock #21008 from Pacific States Felt and Manufacturing of Hayward, Calif., were immersed in 1 liter of aqueous soaking solution containing ytterbium nitrate with a concentration of about 1.64M. After 24 hours, the samples were removed from the soaking solution and passed through the rubber rollers of a commonly available laundry wringer to remove excess solution. The gap between the rollers was adjusted to vary the loading factor of each sample. The metal nitrate imbibed felt samples were allowed to dry at room temperature for a period of about 72 hours. The samples were further dried at 35° C. (±5° C.) for a period of 24 hours.

The samples were then exposed to gaseous ammonia at about room temperature for a period of 24 hours followed by three rinse cycles in one liter of deionized water. The samples were blotted to remove excess water and again allowed to dry at room temperature for 48 hours. The two samples were burned-out together in the same oven by heating to 400° C. (±5° C.) at a rate of about 25° C. (±5° C.)/hr, increasing the temperature to about 450° C. (±5° C.) over one hour, held at that temperature for about 12 hours and then cooled to ambient overnight. The samples were then sintered in a tube furnace by raising the temperature to about 600° C. (±5° C.) rapidly followed by raising the temperature to about 1200° C. (±5° C.) at a rate of about 10° C./min, held there for approximately 12 hours and then allowed to slowly cool to room temperature overnight.

The final products obtained differed greatly in tensile strength although they had the same physical appearance. The first sample, having a loading factor of 1.76, had a measured average tensile strength of 47.5 kPa. The second sample, with a loading factor of 2.39, had a measured average tensile strength (121.7 kPa) that was approximately 2.5 times that of the first sample.

EXAMPLE 2

Two 60 cm×90 cm samples of rayon felt, available as stock #62RV6NT from American Felt and Filter Co. of Westerly, R.I. were immersed in 1 liter of aqueous soaking solution containing ytterbium nitrate with a concentration of about 1.64M. After 24 hours, the samples were removed from the soaking solution and passed through the rubber rollers of a commonly available laundry wringer to remove excess solution. The gap between the rollers was constant so that the loading factor of each sample was the same. The metal nitrate imbibed felt samples were allowed to dry at room temperature for a period of about 72 hours. The samples were further dried at 35° C. (±5° C.) for a period of 24 hours. The samples were then exposed to gaseous ammonia for a period of 24 hours followed by three rinse cycles in one liter of deionized water. The samples were blotted to remove excess water and again allowed to dry at room temperature for 48 hours.

Both samples were heated to 400° C. (±5° C.) at a rate of about 25° C. (±5° C.)/hr, increasing the temperature to about 450° C. (±5° C.) over one hour, held at that temperature for about 12 hours and then cooled to ambient overnight.

The first sample was sintered in a tube furnace by raising the temperature from about 100° C. (±5° C.) to about 600° C. (±5° C.) at a rate of about 20° C./min. The temperature was then raised to about 1600° C. (±5° C.) at a rate of about 10° C./min, held there for approximately 2 hours and then allowed to slowly cool to room temperature overnight.

The second sample was sintered in a tube furnace by raising the temperature from about 100° C. (±5° C.) to about 600° C. (±5° C.) at a rate of about 20° C./min. The temperature was then raised to about 1200° C. (±5° C.) at a rate of about 10° C./min, held there for approximately 2 hours and then allowed to slowly cool to room temperature overnight.

The final products obtained differed greatly in tensile strength although they had the same physical appearance. The first sample had a measured average tensile strength greater than 230 kPa. The second sample had a measured average tensile strength of 113 kPa.

The flexibility of the metal oxide strand or textile is another important physical property if the material is to be used in TPV devices. The bend radius is a quantitative measure of the flexibility of the metal oxide strand or textile and is determined in the following manner. A strip of fibrous material approximately 5 cm wide is cut to a length of at least twice the circumference of the test mandrel. The bend radius is determined by wrapping the test strip completely around the mandrel. The test is failed if the material cracks, tears, breaks or powders to the extent that the original appearance is lost. The bend radius is equal to the test mandrel's radius. Therefore, a material with a bend radius of 1.0 cm is more flexible that a material with a bend radius of 3.0 cm.

Metal oxide strands and textiles made in accordance to the present invention typically have a bend radius between 0.25 cm and 1.00 cm. In comparison, rayon has a bend radius much smaller than 0.25 cm and commercially available zirconium oxide cloth, such as ZYF100 available from Zircar Fibrous Ceramics, of Florida, N.Y. has a bend radius of 0.955 cm. Material with a bend radius between 0.25 cm and 1.0 cm is considered suitable for shaping into a cylindrical burner for use in TPV applications.

The following two examples illustrate the effect of loading factor (Example 3) and sintering temperature (Example 4) on the bend radius of a ytterbium oxide felt.

EXAMPLE 3

Two 15 cm square samples of rayon felt, available as stock #21008 form Pacific States Felt and Manufacturing of Hayward Calif., were immersed in one liter of aqueous soaking solution containing ytterbium nitrate with a concentration of about 1.64M. After 24 hours, the samples were removed from the soaking solution and passed through the rubber rollers of a commonly available laundry wringer to remove excess solution. The gap between the rollers was adjusted to vary the loading factor of each sample. The metal nitrate imbibed felt samples were allowed to dry at room temperature for a period of about 72 hours. The samples were further dried at 35° C. (±5° C.) for a period of 24 hours. The samples were then exposed to gaseous ammonia for a period of 24 hours followed by three rinse cycles in one liter of deionized water. The samples were blotted to remove excess water and again allowed to dry at room temperature for 48 hours. The two samples were burned-out and sintered together as described in Example 1 above.

The final products obtained differed greatly in bend radius although they had the same physical appearance. The first sample, having a loading factor of 1.76, was rather flexible and could be easily wrapped around a test mandrel with a radius of 0.625 cm. The second sample, with a loading factor of 3.77, was brittle and rigid and broke into two pieces when tested with the same 0.625 cm test mandrel.

EXAMPLE 4

Two 15 cm square samples of rayon felt, available as stock #21008 from Pacific States Felt and Manufacturing of Hayward, Calif., were immersed in one liter of aqueous soaking solution containing ytterbium nitrate with a concentration of about 1.64M. After 24 hours, the samples were removed from the soaking solution and passed through the rubber rollers of a commonly available laundry wringer to remove excess solution. The gap between the rollers was adjusted to vary the loading factor of each sample. The metal nitrate imbibed felt samples were allowed to dry at room temperature for a period of about 72 hours. The samples were further dried at 35° C. (±5° C.) for a period of 24 hours. The samples were then exposed to gaseous ammonia for a period of 24 hours followed by three rinse cycles in one liter of deionized water. The samples were blotted to remove excess water and again allowed to dry at room temperature for 48 hours. The two samples were burned-out together in the same oven as described in Example 2.

The sintering process used for the first sample was as follows: the sample was heated to 600° C. (±5° C.) at a rate of about 20° C./min, the heat was increased to approximately 1000° C. (±5° C.) at a rate of about 10° C./min and held at that temperature for 2 hours. The furnace was then turned off and allowed to cool to room temperature of the course of 8 hours.

The sintering process for the second sample was as follows: the second sample was heated to approximately 600° C. (±5° C.) at a rate of about 20° C./min. The heat was then increased to 1500° C. (±5° C.) at a rate of 10° C./min and was held at this temperature for 2 hours. The furnace was then turned off and allowed to cool to room temperature of the course of 8 hours.

The final products obtained by this process differed greatly in flexibility, although they had the same overall appearance. The first sample could easily be wrapped around a test mandrel with a radius of 0.5 cm without damage. The second sample was much more rigid and broke into pieces when the bend radius test was applied with the same 0.5 cm test mandrel.

The emission spectra of the metal oxide textiles and strands are important to their use as photon emissive elements in TPV devices. It has been found that by varying the concentration and selection of the metal nitrate salts in the soaking solution, the emission spectrum of the light emitted from the TPV emitter structure can be systematically altered. In the following, Table 3, the wavelength (nm) and relative intensity (I) of the peaks of the emission spectra for a variety of pure rare earth oxide textiles are given.

TABLE 3

Emission Spectra Peaks and Relative Intensities of Fibrous Metal Oxide Mantles

| Composition | Emission Spectra (nm, I) |
| --- | --- |
| 100% $CeO_2$ | 1500(1) |
| 100% $Dy_2O_3$ | 1300(1), 1750(0.4), 925(0.15) |
| 100% $Er_2O_3$ | 1550(1), 975(0.27), 800(0.11) |
| 100% $Eu_2O_3$ | 2000(1) |
| 100% $Gd_2O_3$ | 1400(1) |
| 100% $Ho_2O_3$ | 2000(1), 1200(0.79) |
| 100% $Nd_2O_3$ | 1500(0.82), 2400(1) |
| 100% $Pr_2O_3$ | 1900(1) |
| 100% $Sm_2O_3$ | 1450(1), 1250(0.73), 1100(0.34) |
| 100% $Tb_2O_3$ | 1850(1) |
| 100% $Tm_2O_3$ | 1225(1), 1700(0.81), 825(0.28) |
| 100% $Yb_2O_3$ | 975(1) |

As demonstrated by the following examples, the relative intensity and the wavelength distribution of the emission spectrum peaks of a TPV emitter structure made of mixture rare earth oxides depends on the selection and proportion of the metal nitrate salts used to imbibe the textile or strand template.

EXAMPLE 5

Rayon knitting (purchased from the Coleman Company, Wichita, Kans.), 30 cm long and 5 cm diameter, was immersed in a mixed nitrate aqueous solution having a total concentration of 1.6M metal ion, but various amounts of $Ce(NO_3)_3$ and $Yb(NO_3)_3$. After 2 hours, the knitting was removed from the solution and centrifuged to remove excess solution. The knitting was then allowed to dry at room temperature for a period of 6 hours and was further dried at about 35° C. for a period of 24 hours. The metal nitrate imbibed knitting was then exposed to gaseous ammonia under ambient conditions of temperature and pressure for a period of 24 hours. The knitting was then subjected to three rinse cycles in one liter of deionized water. The washed knitting was blotted to remove excess water and again allowed to dry at room temperature for 48 hours. The knitting was then cut to a length of 9 cm and one end of the knitting was gathered with a similarly treated strand to form a pouch-like structure. The other end of the knitting was gathered around the outer diameter of steel tubing and secured there with a second piece of similarly treated string. The structure was then burnt-out using a natural gas flame. After the mantle shrank to approximately half it's original dimensions, the gas flow was raised and the mantle was heated to a bright glow. The emission spectrum of the heated mantle was taken with a Si/InAs detector and are given in Table 4.

TABLE 4

Relative Intensities (I) of Emission Spectra Peaks of Fibrous $CeO_2$:$Yb_2O_3$ Mantles

| % $CeO_2$ | I at (1500 nm) | % $Yb_2O_3$ | I at (975 nm) |
| --- | --- | --- | --- |
| 0 | 0 | 100 | 1 |
| 25 | 0.58 | 75 | 1 |
| 50 | 0.98 | 50 | 1 |
| 67 | 1 | 33 | 0.94 |
| 75 | 1 | 25 | 0.74 |
| 100 | 1 | 0 | 0 |

Material processed identically using either 100% cerium nitrate or 100% ytterbium nitrate in the soaking solution have emission spectra characteristic of the individual metal oxides (i.e. 100% $CeO_2$ peak at 1500 nm; 100% $Yb_2O_3$ peak at 975 nm). However, material processed using a mixture of cerium nitrate and ytterbium nitrate has an emission spectrum containing a peaks of both with the peak intensities dependent on the amount of each metal oxide present.

EXAMPLE 6

A knitted metal oxide mantle was made using the same manner as in Example 5 using various amounts of $Dy(NO_3)_3$ and $Er(NO_3)_3$ as the metal nitrates. The emission spectrum of the resulting metal oxide mantle was taken with a Si/InAs detector and are given in Table 5. Material processed identically using either 100% dysprosium nitrate or 100% erbium nitrate in the soaking solution have emission spectra characteristic of the individual metal oxides. However, material processed using a mixture of dysprosium nitrate and erbium nitrate has an emission spectrum containing a peaks of both with the peak intensities dependent on the amount of each metal oxide present.

TABLE 5

| Relative Intensities (I) of Emission Spectra Peaks of Fibrous $Dy_2O_3$:$Er_2O_3$ Mantles | | | | |
|---|---|---|---|---|
| % $Dy_2O_3$ | I at 925 nm | I at 1300 nm | % $Er_2O_3$ | I at 975 nm | I at 1550 nm |
| 0 | 0 | 0 | 100 | 0.27 | 1 |
| 25 | 0.74 | 0.27 | 75 | 0.24 | 1 |
| 50 | 1 | 0.19 | 50 | 0.18 | 0.95 |
| 75 | 1 | 0.22 | 25 | 0 | 0.71 |
| 100 | 1 | 0 | 0 | 0 | 0 |

EXAMPLE 7

A knitted metal oxide mantle was made using the same process as in Example 5 using various amounts of $Er(NO_3)_3$ and $Ho(NO_3)_3$ as the metal nitrates. The emission spectrum of the resulting metal oxide mantle was taken with a Si/InAs detector and are given in Table 6. Material processed identically using either 100% erbium nitrate or 100% holmium nitrate in the soaking solution have emission spectra characteristic of the individual metal oxides. However, material processed using a mixture of erbium nitrate and holmium nitrate has an emission spectrum containing a peaks of both with the peak intensities dependent on the amount of each metal oxide present.

TABLE 6

| Relative Intensities (I) of Emission Spectra Peaks of Fibrous $Er_2O_3$:$Ho_2O_3$ Mantles | | | | | |
|---|---|---|---|---|---|
| % $Er_2O_3$ | I at 1550 nm | I at 975 nm | % $Ho_2O_3$ | I at 1200 nm | I at 2000 nm |
| 0 | 0 | 0 | 100 | 1 | 0.67 |
| 5 | 0.54 | 0.14 | 95 | 1 | 0.49 |
| 10 | 0.89 | 0.26 | 90 | 1 | 0.89 |
| 25 | 1 | 0.19 | 75 | 0.46 | 0.57 |
| 50 | 1 | 0.22 | 50 | 0.28 | 0.26 |
| 75 | 1 | 0.24 | 25 | 0.16 | 0.16 |
| 100 | 1 | 0.25 | 0 | 0 | 0 |

EXAMPLE 8

A knitted metal oxide mantle was made using the same process as in Example 5 using various amounts of $Er(NO_3)_3$ and $Yb(NO_3)_3$ as the metal nitrates. The emission spectrum of the resulting metal oxide mantle was taken with a Si/InAs detector and are given in Table 7. Material processed identically using either 100% erbium nitrate or 100% ytterbium nitrate in the soaking solution have emission spectra characteristic of the individual metal oxides. However, material processed using a mixture of erbium nitrate and ytterbium nitrate has an emission spectrum containing a peaks of both with the peak intensities dependent on the amount of each metal oxide present.

TABLE 7

| Relative Intensities (I) of Emission Spectra Peaks of Fibrous $Er_2O_3$:$Yb_2O_3$ | | | |
|---|---|---|---|
| % $Er_2O_3$ | I at 1550 nm | % $Yb_2O_3$ | I at 975 nm |
| 0 | 0 | 100 | 1 |
| 25 | 1 | 75 | 0.93 |
| 50 | 1 | 50 | 0.55 |
| 75 | 1 | 25 | 0.42 |
| 100 | 1 | 0 | 0.27 |

The previous examples have illustrated how the combination of two metal nitrate salts can be used to vary the spectral characteristics of the resulting metal oxide product. However, ternary, quaternary and other multiple combinations of metal nitrate salts can be used and may also be used in practice of this invention. The following example demonstrates this point.

EXAMPLE 9

A fibrous metal oxide product exhibiting distinct multiple emission spectral bands is made when a 1.6M soaking solution containing $Tm(NO_3)_3$, $Ho(NO_3)_3$ and $Er(NO_3)_3$ were mixed in a 1:1:1 molar ratio. A metal oxide mantle was made in the same manner as given in Example 5. The emission spectrum of the heated mantle was taken with a Si/InAs detector. Distinct emission bands were observed: 975 nm, 1200, 1500, and 2000 nm; with a broad band between 1700–1900 nm.

Materials processed identically with 100% $Tm(NO_3)_3$; 100% $Ho(NO_3)_3$ or 100% $Er(NO_3)_3$ solution had emission spectra peaks as shown above in Table 3. However, material processed using the 1:1:1 mixture of $Tm(NO_3)_3$: $Ho(NO_3)_3$: $Er(NO_3)_3$ has an emission spectrum containing a peaks from all three with the peak intensities dependent on the amount of each metal oxide present.

The previous examples and discussion demonstrate that different combinations of rare earth oxides can be used to change the wavelengths and intensities of the peaks that make up the emission spectra of metal oxide strands or textiles. This principle can be used to tailor the emission spectrum of a metal oxide TPV emitter structure to meet the band gap requirements of a variety of semiconductor photovoltaic cells. The band gap requirements of a photovoltaic cell are considered to be matched by the emission spectrum when the generation of electricity is maximized.

Table 8 has several exemplary formulations of metal oxides, or combinations of metal oxides that can be made to match different photovoltaic cell band gap requirements. In the cases were multiple oxides are mixed, the preferred compositions are those that give a uniform distribution of peak intensities and maximize electricity output. For example, a metal oxide textile having a formulation of 40–75% $CeO_2$ and 60–25% $Yb_2O_3$ has been found to optimize the power output of a GaSb photovoltaic cell. The optimal metal oxide composition is easily determined by gradually varying the amount of each component till the maximum electricity output for the photovoltaic cell is found.

TABLE 8

Examples of Metal Oxide Formulations that
Match Photovoltaic Band Gap Requirement

| Photovoltaic Cell (band gap) | Emitter Formulation |
|---|---|
| Si (1100 nm; 1.1 eV) | $Yb_2O_3$ |
| Ge (1900 nm; 0.66 eV) | $Er_2O_3$; $Sm_2O_3$ |
| GaSb (1800 nm; 0.68 eV) | $Er_2O_3$; $Sm_2O_3$; $Er_2O_3+Sm_2O_3$; $CeO_2+Yb_2O_3$ |
| $CdInSe_2$ (1200 nm; 1.03 eV) | $Yb_2O_3$ |
| $In_xGa_{1-x}As$* (1700–2500 nm; 0.74 eV–0.5 eV) | $Ho_2O_3$; $Nd_2O_3$; $Tm_2O_3$; $Tb_2O_3$; $Pr_2O_3$; $Er_2O_3+Sm_2O_3$ |
| GaInAsSb* (1700–4200 nm; 0.73 eV–0.36 eV) | $Ho_2O_3$; $Nd_2O_3$; $Tm_2O_3$; $Tb_2O_3$; $Pr_2O_3$; $Er_2O_3+Sm_2O_3$ |

*Band gap depends on level of doping in photovoltaic cell.

It is known that the strength of a metal oxide materials, especially those composed of fibers, is proportional to grain size. The fracture stress may be expressed as a function of the inverse square root of the grain size. Therefore, as the grain size decreases, the fracture stress increases. In order to obtain a ceramic metal oxide fiber with high strength, the growth of grain size should be minimized. In particular it is desirable to have relatively small (0.2 μm–2 μm) homogeneous grains of the metal oxide rather than large (>2 μm) varying grains in cases where the fiber has a diameter of about 20 μm. That is to say the microcrystalline grain size should not exceed one tenth of the fiber's diameter. It is well known in the art that an aggregate of fine grained rare earth oxide microcrystals will form undesirable large grains at elevated temperatures. The driving force that causes the growth of large grains, at the expense of small grains is the reduction of the grain boundary energy in the material.

Figure 3:
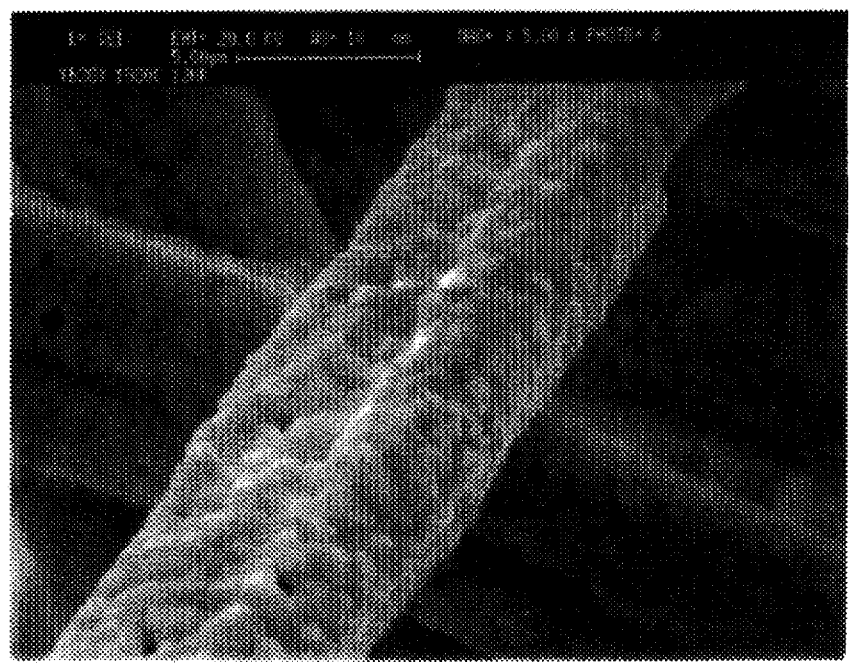
FIG. 3 is a photograph of the electron microscopic image of an essentially pure $Yb_2O_3$ fiber after having been subjected to a temperature of 1500° C. for 12 hours.

It has been found that the grain size may be controlled by the addition of 1–10 mol % of thorium oxide into a rare earth metal oxide fibrous compositions that make up the strand or textile. This is easily done by the inclusion of between 1–10 mol % of thorium nitrate in the metal nitrate soaking solution. FIG. 3 is a photomicrograph of a essentially pure $Yb_2O_3$ fiber made in accordance to the practice of the present invention after heating to 1500° C. for 12 hours. The average grain size of microcrystals that make up the fiber shown in FIG. 3 is 0.79 μm for a fiber than is about 7 μm in diameter. One can also see in FIG. 3 the large variation in microcrystalline grain size. This leads one to believe that continued exposure to high temperature over extended periods of time (weeks or months) will cause the microcrystals to continue their growth in size, which already exceeds ⅒th of the diameter of the fiber.

Figure 4:
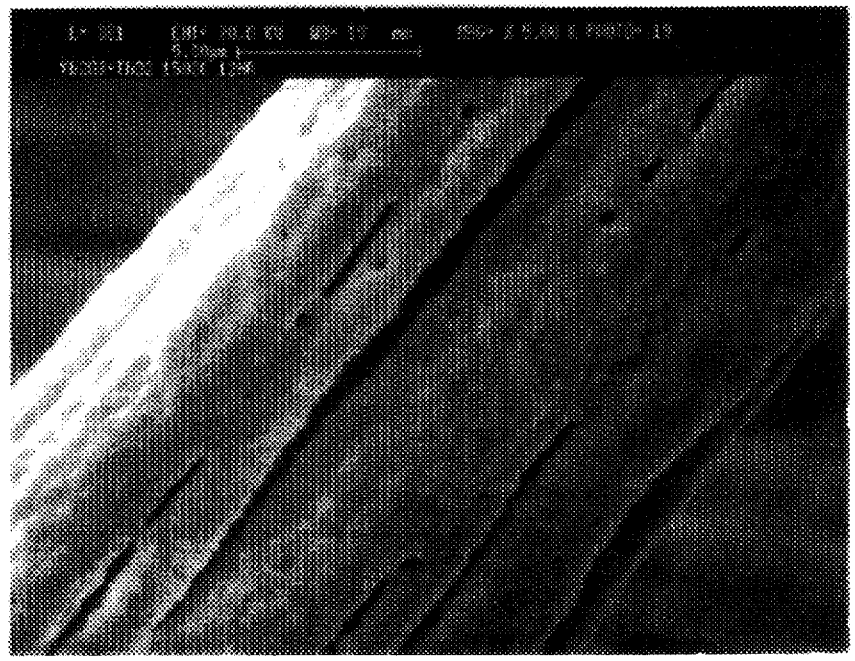
FIG. 4 is a photograph of the electron microscopic image of a $Yb_2O_3$ fiber containing 2 mol % $ThO_2$ after having been subjected to a temperature of 1500° C. for 12 hours.

In contrast to this is the fiber shown in FIG. 4 which is a photomicrograph of a $Yb_2O_3$ fiber with 2 mol % of $ThO_2$ made using the method of the present invention that has been subjected to 1500° C. for 12 hours. As shown in FIG. 4, the average microcrystalline grain size is 0.32 μm for a fiber with an average diameter of about 6 μm. The microcrystals are uniform in size and it is apparent that further growth of the microcrystalline grain size has been inhibited. Therefore, the incorporation of thorium oxide effectively inhibits microcrystalline grain growth under high temperature conditions as encountered in a TPV application. By doing this the long term strength and durability of the metal oxide fiber will be enhanced.

The present invention has been described in relation to limited examples which are for illustrative purposes and are not intended to limit the scope of the invention. Although a number of specific embodiments and compositions have been described and illustrated herein, it will be apparent to those skilled in the art that further variations are possible. Thus, the present invention may be practiced otherwise than specifically described, and therefore is defined by the following claims.

What is claimed is:

1. A metal oxide textile comprising:
   at least one rare earth metal oxide selected from the group of metals consisting of Ce, Dy, Er, Eu, Gd, Ho, Nd, Pr, Sm, Tb, Tm, Yb, and Th and mixtures thereof;
   wherein the heated fibrous composition has a multiband emission spectrum with wavelength peaks between 400 nm and 2500 nm and a tensile strength greater than 75 kPa.

2. A metal oxide textile as recited in claim 1 wherein the fibrous material has microcrystalline grain size no greater than 2 μm.

3. A metal oxide textile as recited in claim 1 wherein the fibrous composition has a bend radius between 0.25 cm and 1.00 cm.

4. A metal oxide textile comprising a binary mixture of $Er_2O_3$ and $HO_2O_3$ having a multiband emission spectrum with wavelength peaks at 975 nm, 1200 nm, 2000 nm and 1550 nm, and a tensile strength greater than 75 kPa.

5. A metal oxide textile comprising a binary mixture of $Er_2O_3$ and $Yb_2O_3$ having a multiband emission spectrum with wavelength peaks at 975 nm and 1550 nm, and a tensile strength greater than 75 kPa.

6. A metal oxide textile comprising a binary mixture of $Ho_2O_3$ and $ThO_2$ having a multiband emission spectrum with wavelength peaks at 1200 nm and 2000 nm, and a tensile strength greater than 75 kPa.

7. A metal oxide textile comprising a binary mixture of $CeO_2$ and $Yb_2O_3$ having a multiband emission spectrum with a sharp wavelength peak at 975 nm and a broad peak centered at 1450 nm, and a tensile strength greater than 75 kPa.

8. A metal oxide textile as recited in claim 1 wherein the composition is a binary mixture of $Dy_2O_3$ and $Er_2O_3$ having a molar ratio between 0.33 and 3, a multiband emission spectrum with peaks at 925 nm, 975 nm, 1250 nm, and 1500 nm.

9. A metal oxide textile comprising a ternary mixture of $Tm_2O_3$, $Ho_2O_3$, $Er_2O_3$ having a multiband emission spectrum with wavelength peaks at 975 nm, 1200 nm, 1500 nm, 1750 nm and 2000 nm, and a tensile strength greater than 75 kPa.

10. A metal oxide textile comprising an intimate mixture of at least one rare earth metal oxide selected from the group of metals consisting of Ce, Dy, Er, Eu, Gd, Ho, Nd, Pr, Sm, Tb, Tm, and Yb; and effective amount of $ThO_2$ so that the microcrystalline grain size is no greater than 2 μm.

11. A metal oxide textile comprising an intimate mixture of at least one rare earth metal oxide selected from the group of metals consisting of Ce, Dy, Er, Eu, Gd, Ho, Nd, Pr, Sm, Tb, Tm, and Yb; and $ThO_2$ in the range of from 1 to 10% by weight so that the microcrystalline grain size is no greater than 2 μm.

* * * * *